US011686569B1

(12) United States Patent
Matthews (10) Patent No.: US 11,686,569 B1
(45) Date of Patent: Jun. 27, 2023

(54) DYNAMIC DIAMETER MEASUREMENT DEVICE FOR DOWNHOLE WIRELINE CABLES

(71) Applicant: Equipment Unlimited Inc., Gladewater, TX (US)

(72) Inventor: Michael Matthews, Gladewater, TX (US)

( * ) Notice: Subject to any disclaimer, the term of this patent is extended or adjusted under 35 U.S.C. 154(b) by 0 days.

(21) Appl. No.: 17/481,125

(22) Filed: Sep. 21, 2021

Related U.S. Application Data

(60) Provisional application No. 63/081,219, filed on Sep. 21, 2020.

(51) Int. Cl.
*G01V 3/00* (2006.01)
*G01B 7/13* (2006.01)
(Continued)

(52) U.S. Cl.
CPC ............ *G01B 7/13* (2013.01); *G01V 3/08* (2013.01); *G01V 3/26* (2013.01); *G01V 3/28* (2013.01);
(Continued)

(58) Field of Classification Search
CPC ... G01B 7/13; G01V 3/08; G01V 3/26; G01V 3/28; G01V 3/30; G01V 3/18; G01V 3/24
(Continued)

(56) References Cited

U.S. PATENT DOCUMENTS

| 2005/0274190 | A1* | 12/2005 | Neumann | G01B 7/13 |
| | | | | 73/718 |
| 2016/0123136 | A1* | 5/2016 | Puzrin | E21B 47/08 |
| | | | | 33/544.1 |

(Continued)

*Primary Examiner* — Raul J Rios Russo
(74) *Attorney, Agent, or Firm* — Shiells Law Firm P.C.; Theodore F. Shiells (57) ABSTRACT

A diameter measurement device for measuring the diameter of a wireline cable dynamically during moving in and out of a borehole. The measurement device has a first pair of opposed shafts, a rotating roller on each shaft of said first pair of opposed shafts, a first resilient member mounted to urge at least one of the shafts of said first pair of opposed shafts toward the wireline cable to be measured, and a first intrinsic measuring unit operatively associated with the first resilient member to measure the displacement thereof. The measuring device further has at least a second pair of opposed shafts angularly displaced with respect to the first pair of opposed shafts, a rotating roller on each shaft of said second pair of opposed shafts, a second resilient member mounted to urge at least one of the shafts of said second pair of opposed shafts toward the wireline cable to be measured, and a second intrinsic measuring unit operatively associated with the first resilient member to measure the displacement thereof as the wireline cable is moved lengthwise between the rollers; each of said first and second intrinsic measuring devices outputting to a digitizer for generating digital measurements of the diameter at various positions on the circumference of and along the length of said wireline cable, which measurements are transmitted to and stored in a logging device. At least one of the first and second intrinsic measuring units can be an eddy current measurement device to measure deflection of at least one of the first and second resilient members using eddy currents.

4 Claims, 5 Drawing Sheets

(51) Int. Cl.
  *G01V 3/08*   (2006.01)
  *G01V 3/26*   (2006.01)
  *G01V 3/28*   (2006.01)
  *G01V 3/30*   (2006.01)
  *G01V 3/18*   (2006.01)
  *G01V 3/24*   (2006.01)

(52) U.S. Cl.
  CPC .................. *G01V 3/30* (2013.01); *G01V 3/18* (2013.01); *G01V 3/24* (2013.01)

(58) Field of Classification Search
  USPC .......................... 324/323, 331, 345, 346, 376
  See application file for complete search history.

(56) References Cited

U.S. PATENT DOCUMENTS

| | | | |
|---|---|---|---|
| 2018/0156936 A1* | 6/2018 | Zhang | ...................... G01V 3/18 |
| 2021/0239448 A1* | 8/2021 | Toniolo | ............... E21B 47/0025 |

\* cited by examiner

DYNAMIC DIAMETER MEASUREMENT DEVICE FOR DOWNHOLE WIRELINE CABLES

BACKGROUND OF THE INVENTION

Priority Claim

The present invention claims priority to provisional patent Appln. Ser. No. 63/081,219, filed Sep. 21, 2020, the entire text of which is specifically incorporated by reference herein without disclaimer.

Field of the Invention

The present invention generally relates to a wireline downhole device, and more particularly to a device for dynamically making diameter measurements along the length of a wireline cable in conjunction with a wireline downhole cable handling device, as the wireline cable being fed into or drawn out of a borehole in the earth of the type used in oil and gas fields.

Description of Related Art

In oil and gas field operations, holes are drilled deep into the earth to locate and/or extract oil and gas. Once the holes are drilled, and usually cased, it is commonly desired to be able to perform various operations downhole, including but not limited to using sondes and other devices to measure various parameters of the rock formations into which the borehole has been drilled, determining the route and depth of the borehole, assessing the condition of the casing for the hole, lowering fish or other tools down the borehole, etc. To do so, a wireline cable is commonly used.

A wireline cable may be simply a flexible cable or, in some cases, may also have one or more electrical conductors to transmit signals from downhole instruments or tools to the surface. To facilitate operations, the wireline cable ("cable") is commonly lowered downhole into the borehole through a tube already inserted into the borehole, the tube usually being lubricated and commonly being called a "grease tube."

It is important to have exact information on the diameter of the cable along its length. This is because the available space between the cable and the grease tube is limited. Such diameter measurements can determine whether the cable is stretched, out-of- round, worn, kinked, crushed or otherwise mechanically damaged or unsound, to minimize the chance of the cable failing or jamming in the tube downhole, which can be very costly to correct.

The weight per length of a cable and the degree of total stretch that a cable experiences from its weight when extended downhole is a function of its diameter at every point along its length, as well as other factors. Thus, keeping a running tally of the diameter of a cable allows more accurate measurement of the weight per length of a cable at each lengthwise position, and hence allows more accurate calculation of the actual position of the end of the cable in the borehole, taking into account the amount of stretch of the cable.

Many devices are known to measure the diameter of a wire in manufacturing settings. One such device disclosed in the CN1102087100A patent application uses an optical method for detecting the diameter of a cable in real time by using an FPGA-based laser caliper method. By using optical methods, it must be ensured that there is no interference of stray light and that the laser has good stability to ensure peak stability. This technique increases the overall cost and a dirty environment can make the measurement inaccurate.

Although existing devices can dynamically measure cable diameter in relatively clean manufacturing environments, such devices have not been employed in oil and gas field downhole operations, where the environment is often dirty and the cable and/or its diameter measurement device is subject to damage due to rough handling. These severe conditions can cause difficulty in measuring the diameter of the wireline cable accurately in downhole applications. Therefore, there is a need for a diameter measurement device to accurately dynamically measuring diameter of the wireline cable under the severe conditions of downhole operations that ameliorates the difficulties experienced in the art.

OBJECT OF THE INVENTION

In accordance with teachings of the present invention a diameter measurement device for making measurements of the diameter of a wireline cable dynamically during moving the cable in or out of a borehole is provided that is resistant to inaccuracies from dirty environments and rough handling.

SUMMARY OF THE INVENTION

In accordance with teachings of the present invention, a diameter measurement device for measuring the diameter of a wireline cable dynamically during moving in and out of a borehole is provided having a first pair of opposed shafts, a rotating roller on each shaft of said first pair of opposed shafts, a first resilient member mounted to urge at least one of the shafts of said first pair of opposed shafts toward the wireline cable to be measured, and a first intrinsic measuring unit operatively associated with the first resilient member to measure the displacement thereof. The measuring device further has at least a second pair of opposed shafts angularly displaced with respect to the first pair of opposed shafts, a rotating roller on each shaft of said second pair of opposed shafts, a second resilient member mounted to urge at least one of the shafts of said second pair of opposed shafts toward the wireline cable to be measured, and a second intrinsic measuring unit operatively associated with the first resilient member to measure the displacement thereof as the wireline cable is moved lengthwise between the rollers; each of said first and second intrinsic measuring units outputting to a digitizer for generating digital measurements of the diameter at various positions on the circumference of and along the length of said wireline cable, which measurements are transmitted to and stored in a logging device.

In another embodiment, at least one of the first and second intrinsic measuring units is an eddy current measurement device to measure deflection of at least one of the first and second resilient members using eddy currents.

In another embodiment, the digitized measurements that are stored in the logging device are output to a recalibration unit that uses the measured diameter of the cable at various positions along the length of the cable to determine both the weight of the cable downhole and the amount of stretch of the cable downhole due to its weight per unit length at each of said various positions along the length of the cable, thereby to recalibrate the calculated position of the end of the cable downhole.

DETAILED DESCRIPTION

Figure 1:
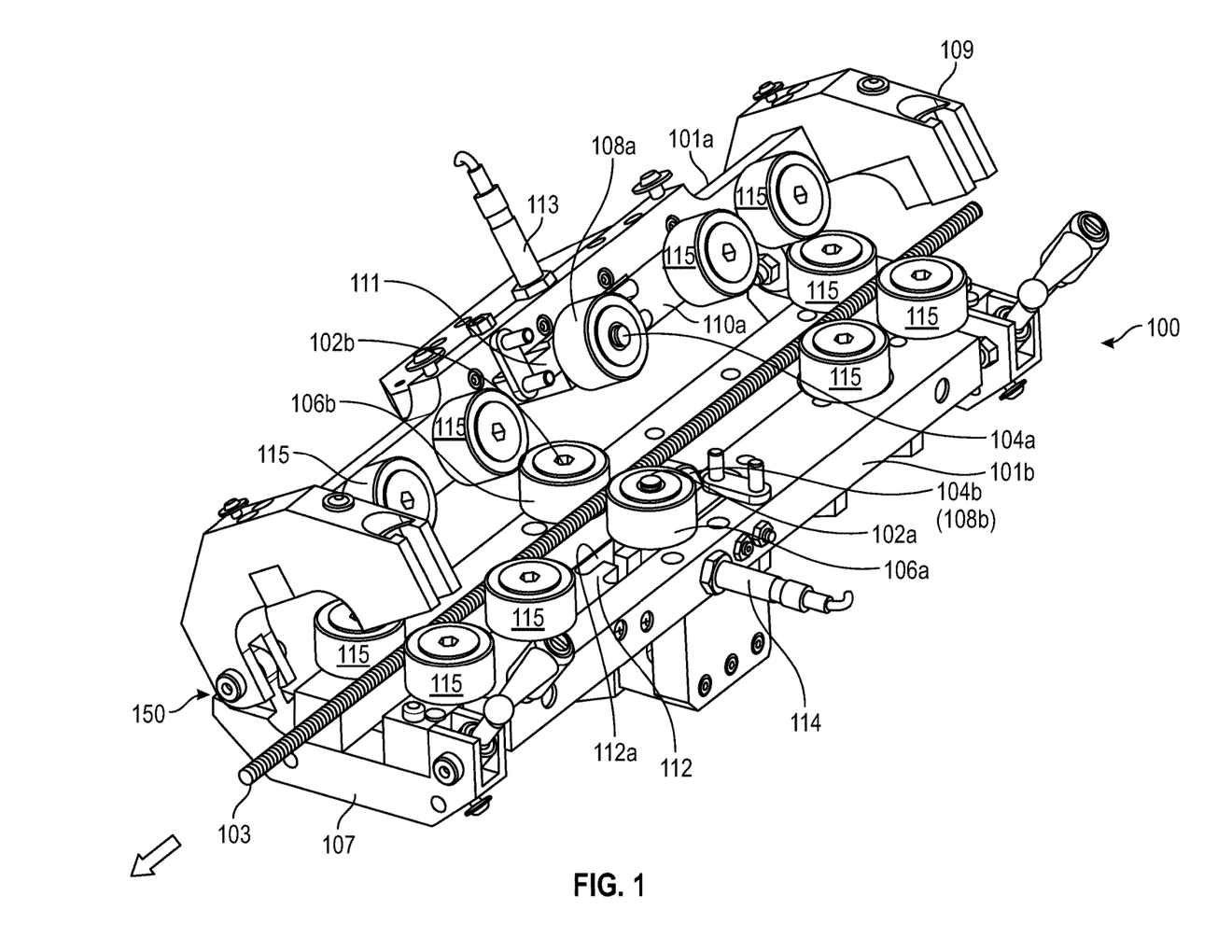
FIG. 1 depicts a perspective view of a dynamic diameter measurement device in accordance with an embodiment of the present invention with sensors adapted for eddy current measurement of deflection of a resilient member, its clamshell frame being partially open and viewed from the left end with the cable exit to the left of the figure, with sensors inserted directing into the clamshell frame.

Turning to the drawings, and initially to FIG. 1 thereof, FIG. 1 illustrates a perspective view of one embodiment of a dynamic diameter measurement device 100 disposed at the end of a wireline handling device (not shown) for measuring the diameter of a wireline cable 103 dynamically as it is moved in and out of a borehole, depicted with its clam-shell top half 101a and bottom half 101b of its clamshell frame 150 in a partially opened condition, to show the placement of the cable 103 in the device. The diameter measuring device 100 includes a first pair of opposed shafts 102a, 102b, a second pair of opposed shafts 104a, 104b, a first pair of rollers 106a, 106b on each of said respective shafts 102a and 102b, and a second pair of rollers 108a, 108b on each of said respective opposed shafts 104a and 104b. At the generally inner portions of clam-shell top and bottom halves 101a and 101b, there is a first resilient member 111 on at least one of said opposed shafts 102a and 102b, and a second resilient member 112 on at least one of said opposed shafts 104a and 104b. Thus, when the clam-shell top and bottom halves 101a and 101b are closed and locked for operation (not shown in FIG. 1), the wireline cable 103 runs between the first pairs of rollers 106a, 106b mounted respectively on shafts of 102a, 102b and, and at an angularly displaced position (preferably approximately 90 degrees), between the second pair of rollers 108a, 108b 106b (only partly visible in FIG. 1) mounted respectively on opposed shafts 106a, 106b (only partly visible in FIG. 1). In use, one end of the measurement device 100 would be disposed on either end of the wireline handling device that delivers the cable into, and pulls the cable out of, a borehole.

It should be noted that, for convenience in the present description, the open end 107 of the clamshell frame 150, as viewed in FIG. 1, will be considered the "exit" of the device, i.e., the end closest to the borehole, i.e., the end from where the cable 103 is run into, and pulled out of, a borehole. However, it should be understood that the measurement device can be disposed with either of its ends of its clamshell frame closest to the borehole.

In FIG. 1, measurement device 100 is depicted in a perspective side view, viewed from its open end 107, with its clamshell frame 150 opened to allow placement of the cable 103 between the rollers prior to the hinged top 155 being closed and latched for operation, with both locking members 151, 152 open and unlocked, for illustration purposes. Of course, in use, clamshell frame 150 could be closed and both locking members 151, 152 would be locked in place such that the cable is pressed against and held in place between the rollers 102a, 102b, between the angularly displaced rollers 108a, 108b, as well as twelve guide rollers 115 at the entrance and exit of the measurement device, which maintain the travel pf cable 103 in a generally straight line as it passes from measurement device 100. In this embodiment of the present invention, when the clamshell frame 150 is closed and locked, the respective axes of the rollers 108a, 108b and 106a, 106b will be positioned approximately 90 degrees from the respective axes of 106a, 106b. More pairs of rollers whose axes are positioned at angles different from 90 degrees can be employed for more accuracy in locating deformities in the cable 103 and more or fewer guide rollers can be employed.

As the cable 103 passes through the measurement device 103, any deformities in the diameter of the cable 103 will cause the resilient members 111, 112 to deform and absorb energy upon deformation and release energy upon unloading as the cable 103 passes the rollers 104a, 104b and 108a, 108b.

Figure 2:
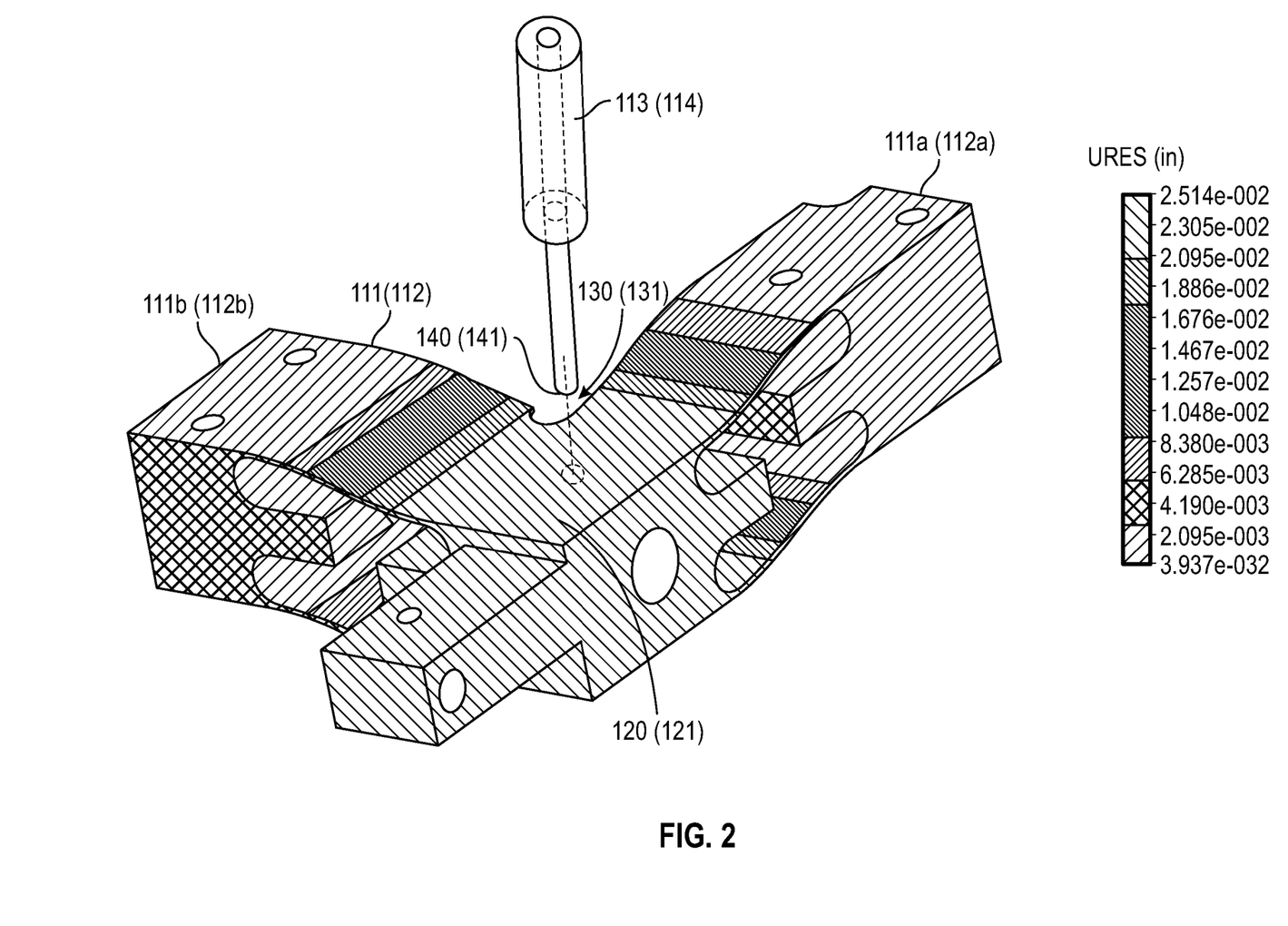
FIG. 2 depicts a perspective enlarged view of the resilient member and juxtaposed sensor adapted for eddy current measurement of deflection shown in FIG. 1, the resilient member being shaded to show exaggerated relative deflection.

FIG. 2 illustrates an enlarged perspective view of respective resilient members 111, 112 in accordance with an embodiment of the present invention, shown with a greatly exaggerated amount of deflection, along with their respective measurement units 113, 112 (which are shown juxtaposed "in space," without the clamshell half 101a, 101b that supports and partially conceals them, as shown in FIG. 1). As depicted in FIG. 2, the resilient members 111, 112 can be configured in an approximately L-shape, having a first leg 111a, 112a that is generally parallel to the longitudinal axis of the cable and a second leg 111b, 112b that is generally transverse to the longitudinal axis of the cable and can be somewhat shorter than the first leg, with a flat-faced corner 120, 121 between them. With this arrangement, the second leg 111b, 112b assists in limiting excessive side-to-side deflection and excessive axial twisting of the first leg 111a, 112b, and the first leg 111a, 112b assists in limiting excessive side-to-side deflection and excessive axial twisting of the second leg 111b, 112b, thus improving the lifetime, reliability and consistency of the eddy current measurements based upon deflection of the resilient members 111, 112.

In the embodiment depicted in FIGS. 1 and 2, measuring units 113, 114, which can be eddy current sensors are inserted through holes in the clamshell frame halves 101a, 101b for measuring the displacement of the flat area 120 of resilient members 111, 112, preferably by measurement of the change of a magnetic or impedance property by the measuring units 113, 114. Measuring units 113, 114 each have a sensing end 140, 141, respectively, that extends into through holes in their respective clamshell half 101a, 101b and terminates proximal to, but spaced apart from, the movable flat-faced corner 120, 121 of resilient members 111, 112, respectively. As the cable 103 moves through measurement device 100, deformities in the cable 103 that cause rollers 106a, 108a and their respective axles 102a, 104a, to be displaced with cause the flat-faced corner 120, 121 to become closer or farther from the sensing ends 140, 141, and that change of geometry alters the magnetic properties of the intrinsic magnetic loop including the resilient members 111, 112 and their respective measuring units 113, 114, which change is detected as an electrical signal by measuring units 113, 114.

In a simple form, an eddy current measuring unit consists of a ferrite U-core and a coil. The impedance change can be converted into a voltage change by using a measuring bridge. The measurement of an intrinsic property, such as the magnetic property, is preferred because it is relatively immune to adverse conditions such as dirt, oil, grease, salt or water, which could disrupt the measurement by other sensors, such as laser sensors, optical sensors, ultrasonic air-gap sensors, etc.

The sensitivity, linearity and hysteresis of an eddy current sensor depend strongly on measuring conditions, i.e., exciting current and testing frequency. The testing conditions should be optimized to obtain a high sensor sensitivity, a good linearity and a low hysteresis. The testing frequency is normally selected between 100 Hz and 10 kHz. In this case the optimal exciting current changes from 25 mA to 50 mA.

The voltage output of the measuring units 113, 114 is analog, but can be digitized for communication over a communication network, data storage and use in calculations involving other parameters of the cable, such as linear stress and linear position measured by other devices. The measured information from the measuring unit is communicated to a logging device (not shown) and thereby recorded and compared with other data to provide analytics on cable longevity, when to replace the cable before failures are likely, support for warranty and quality control issues related to cable performance etc. The digitized data is fed into software so that the diameter information may be matched to the length position on the wireline cable where the diameter being measured, as well as being mated with other information measured and tracked by the measuring units 113, 114. The digital measurement can be then be used in logging and recalibration of the position of the end of the cable downhole as discussed above.

In an embodiment of the present invention, the measurement unit can perform bi-directional checks on the diameter of the wireline cable 103, i.e., when the cable is moved into the borehole or pulled out of the borehole.

The wireline cable 103 is also known under multiple names such as electromechanical cable, e-line, logging cable, perforating cable, wireline, electro-optical cable, fiber optic cable, braided line, swab line, synthetic rope, composite jacketed cable, plastic coated cable, plastic jacketed cable, Streamline, EcoSeal, greaseless cable, etc.

In an exemplary embodiment of the present invention depicted in FIG. 1, the rollers 106a, 106b and the rollers 108a, 108b are disposed to accept wireline cables having diameters of approximately 7/32" and 9/32", as well as other sizes of wireline logging cable while spooling in and out of an oil well. Further, the rollers 106a, 106b and the rollers 108a, 108b can be the inner race of a needle bearing and each roller can ride on the double shielded bearings.

Figure 3:
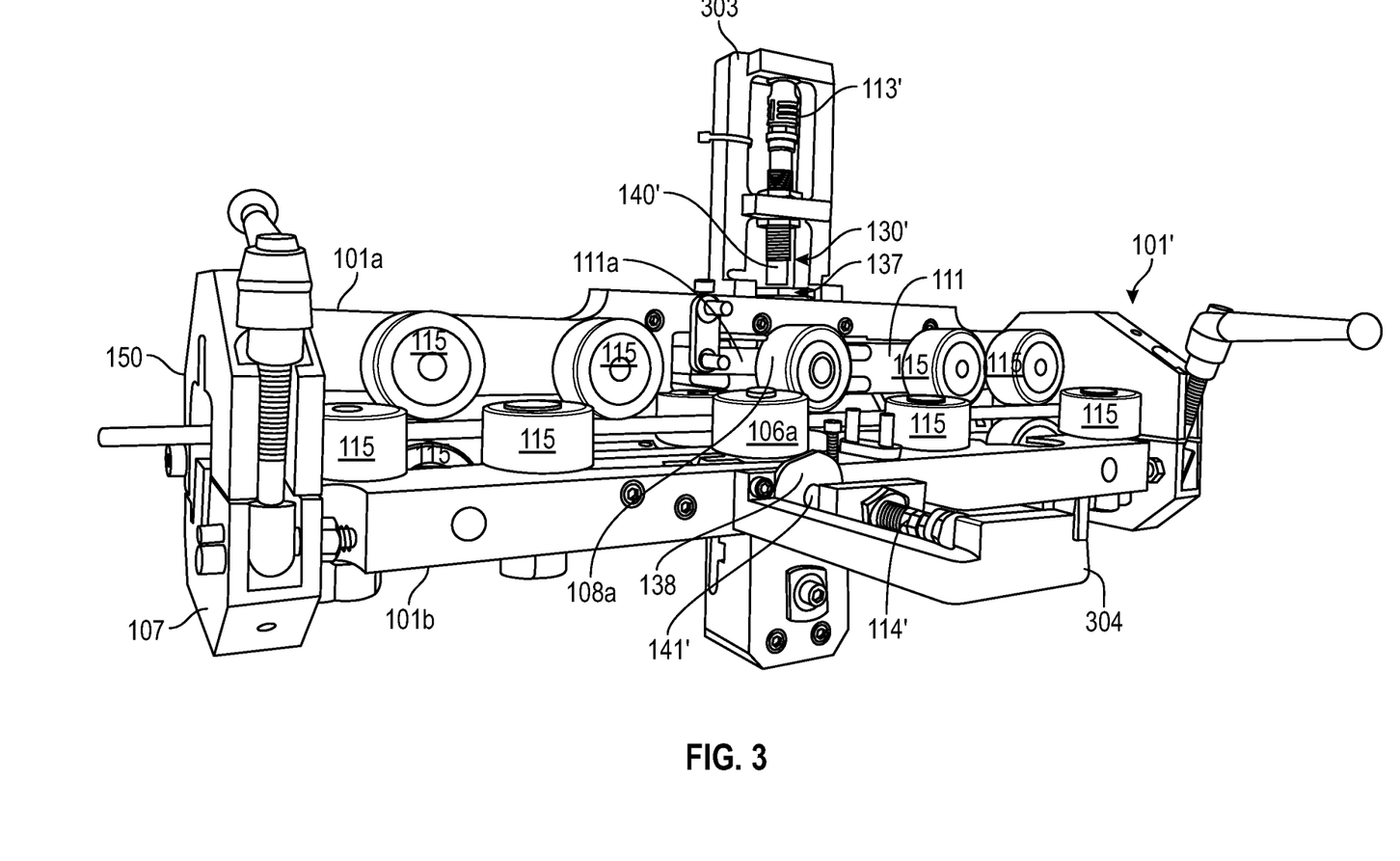
FIG. 3 depicts a perspective view of a dynamic diameter measurement device having the same clamshell frame as the FIG. 1 embodiment, in the closed and partially locked position, viewed from the front with the cable exit to the left of the figure, with a modified form of sensors held in a sensor frames and having exposed sensor ends.
Figure 4:
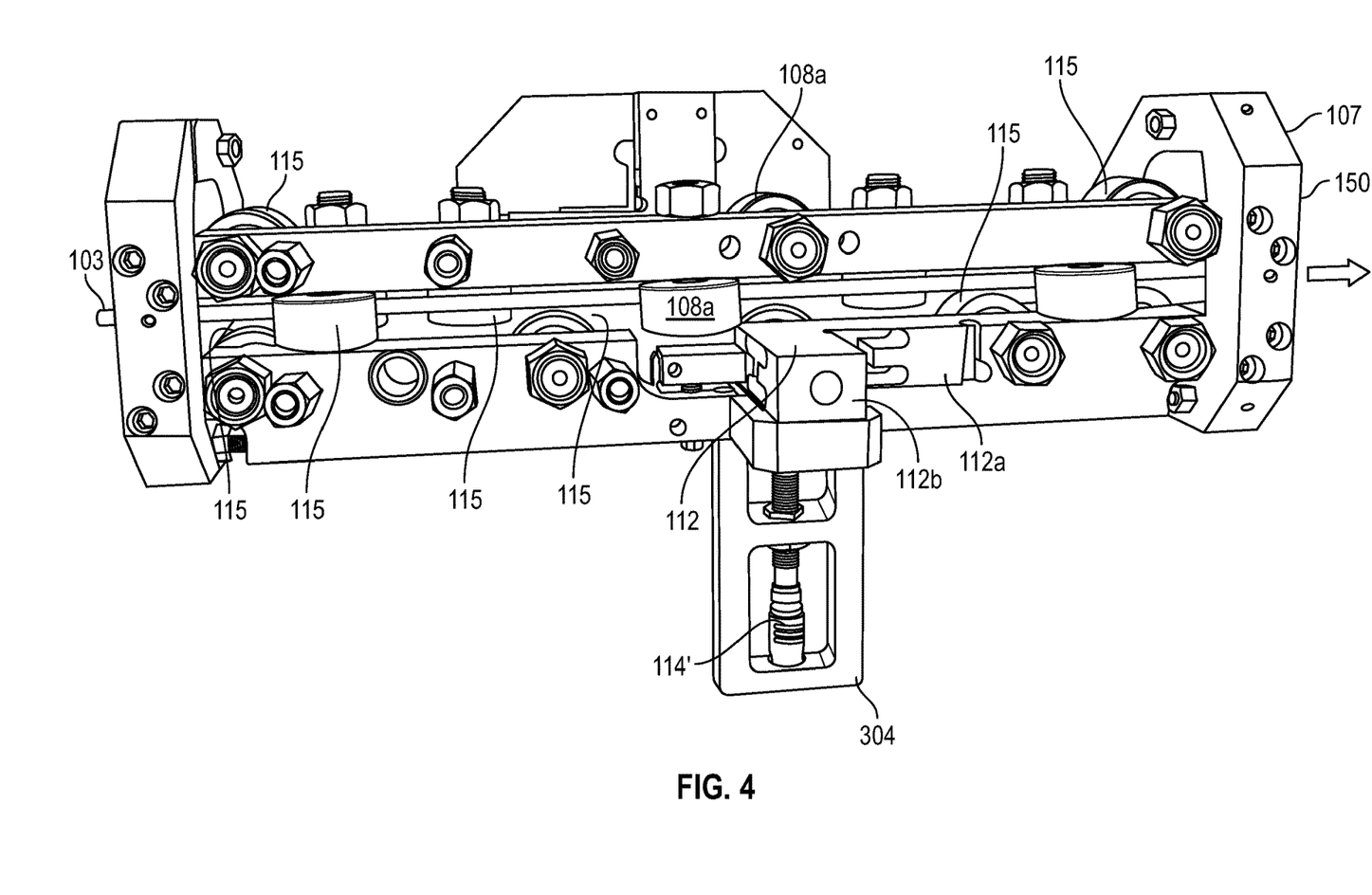
FIG. 4 depicts a perspective view of the dynamic diameter measurement device in accordance with an embodiment of the present invention shown in FIG. 3, in the closed and partially locked position, viewed from the bottom with the cable exit to the right of the figure.
Figure 5:
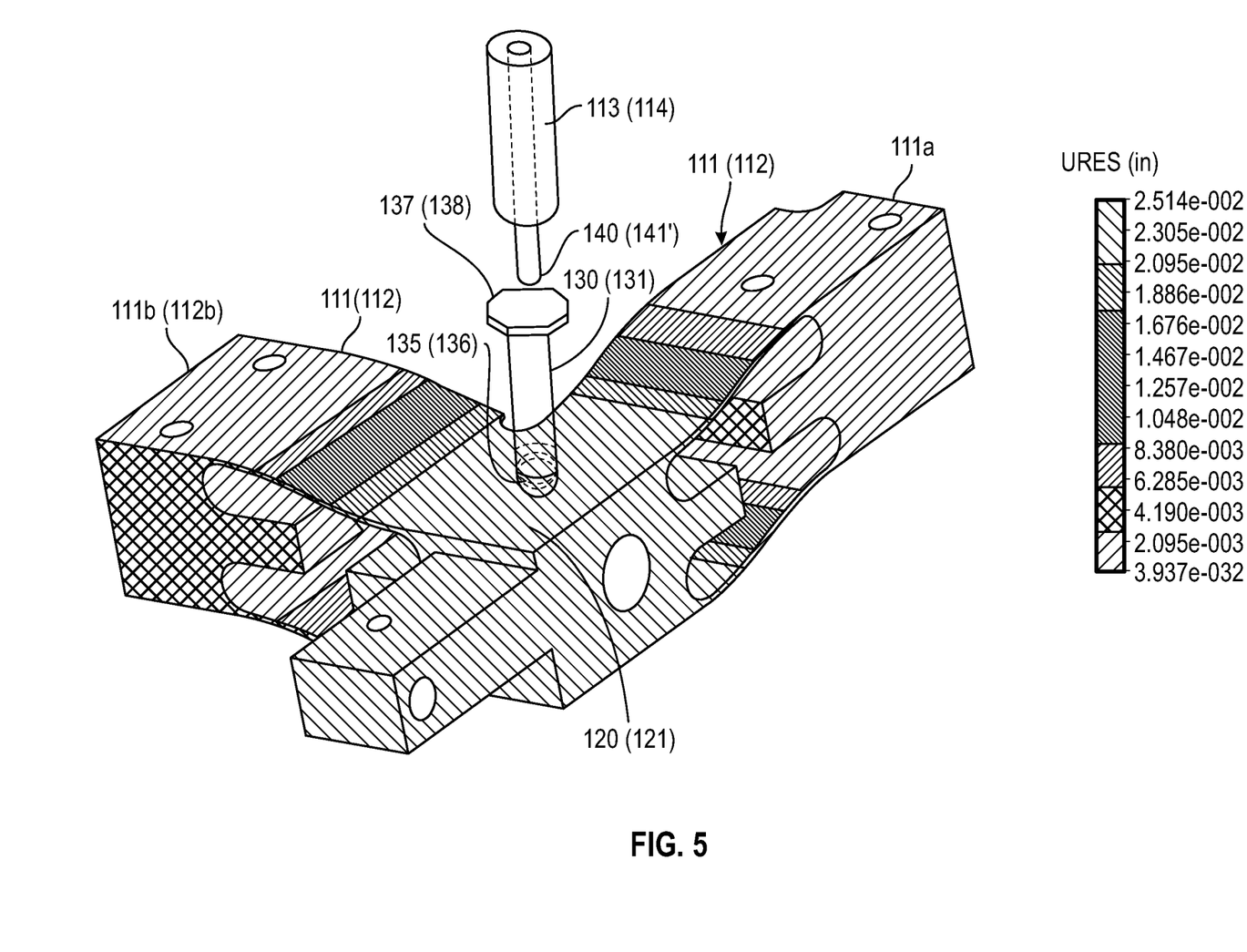
FIG. 5 depicts a perspective enlarged view of the resilient member and juxtaposed sensor employed in the embodiment of the present invention shown in FIGS. 3 and 4, the resilient member being shaded to show exaggerated relative deflection.

FIGS. 3-5 illustrate another embodiment of the dynamic diameter measurement device 100', where measurement units 113', 114' of the measurement device 100' are held in place by external frames 303, 304 so that their sensing ends 140', 141' are exposed outside of the clamshell halves 101a, 101b. In this embodiment, respective posts 130, 131 (not shown in FIG. 1) are connected to the flat faced portion 120 of the respective resilient members 111, 112 by a threaded end 135, 136 to move therewith, and slidably extend through holes through a portion of clamshell halves 101a, 101, terminating in an exposed flat head 137, 138.

In this embodiment, the sensor ends 140', 141' of the measurement units 113', 114' are spaced apart from their respective flat heads 137, 138. Displacement the resilient members 111', 112' causes the posts 130, 131 to move axially in and out of the through-holes 307, 308 in backbones 309, 310 hereby changing the size of the gap 130', 131' between sensor ends 140', 141; and flat heads 137, 138. As with the embodiment of FIGS. 1 and 2, this change of spacing will cause a change in the magnetic properties of the magnetic loop, and thereby a change in the eddy current measurement that can be sensed electrically by measuring units 113' and 114', thereby permitting measurement of changes in the diameter of the cable.

While this technology is illustrated and described in a preferred embodiment, a diameter measurement device disposed in a wireline downhole device for dynamically measuring the diameter of a wireline cable during moving in and out of a borehole can be produced and described in many different configurations, forms without deviating from the scope of present invention.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A diameter measurement device disposed on a wireline downhole cable handling device for measuring the diameter of a wireline cable dynamically during moving the cable in or out of a borehole, comprising:

a first pair of opposed shafts, a first resilient member mounted to urge at least one of the shafts of said first pair of opposed shafts toward the wireline cable to be measured, a first intrinsic measuring unit including an electronic sensor for measuring at least one intrinsic property, taken from the group of impedance and magnetism, that varies with the amount of displacement of said first resilient member and is operatively associated with the first resilient member to measure the displacement thereof and output an electronic signal correlating to said displacement, at least a second pair of opposed shafts angularly displaced with respect to the first pair of opposed shafts, a rotating roller on each shaft of said second pair of opposed shafts, a second resilient member mounted to urge at least one of the shafts of said second pair of opposed shafts toward the wireline cable to be measured, a second intrinsic measuring unit including an electronic sensor for measuring at least one intrinsic property, taken from the group of impedance and magnetism, that varies with the amount of displacement of said first resilient member and is operatively associated with the first resilient member to measure the displacement thereof and output an electronic signal correlating to said displacement as the wireline cable is moved lengthwise between the rollers; wherein each of said first and second intrinsic measuring devices outputs said electronic signals to a digitizer for generating digital measurements of the diameter at various positions on the circumference of and along the length of said wireline cable, which measurements are transmitted to and stored in a logging device.

2. The diameter measurement device of claim 1, wherein at least one of the first and second intrinsic measuring units is an eddy current measurement device to measure displacement of at least one of the first and second resilient members using eddy currents.

3. The diameter measurement device of claim 1, wherein the digitized measurements stored in the logging device are output to a recalibration unit that recalibrates the calculated position of the end of the cable downhole using the measured diameter of the cable at various positions along the length of the cable to determine both the weight of the cable downhole and the amount of stretch of the cable downhole due to its weight per unit length at each of said various positions along the length of the cable.

4. The diameter measurement device of claim 2, further comprising a recalibration unit that uses digitized measurements stored in the logging device output to said recalibration unit to recalibrate the calculated position of the end of the cable downhole using the measured diameter of the cable at various positions along the length of the cable to determine both the weight of the cable downhole and the amount of stretch of the cable downhole due to its weight per unit length at each of said various positions along the length of the cable.

* * * * *